US006426816B1

(12) United States Patent
Wu et al.

(10) Patent No.: US 6,426,816 B1
(45) Date of Patent: Jul. 30, 2002

(54) WIDE TRANSMISSION OPTICAL COMB FILTER WITH WIDE PASS BAND AND WIDE STOP BAND

(75) Inventors: Kuang-Yi Wu, Plano; Charles Wong, Richardson; Jian-Yu Liu, Garland; Ye Li, Plano, all of TX (US)

(73) Assignee: Chorum Technologies, LP, Richardson, TX (US)

( * ) Notice: Subject to any disclaimer, the term of this patent is extended or adjusted under 35 U.S.C. 154(b) by 134 days.

(21) Appl. No.: 09/614,782

(22) Filed: Jul. 12, 2000

Related U.S. Application Data

(60) Provisional application No. 60/201,648, filed on May 1, 2000.

(51) Int. Cl.$^7$ ............................................... H04J 14/06
(52) U.S. Cl. ..................... 359/122; 359/124; 359/156; 359/246; 359/251; 385/14; 385/31; 385/39; 385/28
(58) Field of Search ................................ 359/122, 124, 359/497, 156, 246, 251, 115, 117, 127, 128; 385/14, 31, 39, 28

(56) References Cited

U.S. PATENT DOCUMENTS

| | | | |
|---|---|---|---|
| 4,566,761 A | 1/1986 | Carlsen et al. | 350/401 |
| 4,685,773 A | 8/1987 | Carlsen et al. | 350/401 |
| 5,596,661 A | 1/1997 | Henry et al. | 385/24 |
| 5,680,490 A | 10/1997 | Cohen et al. | 385/24 |
| 5,694,233 A | 12/1997 | Wu et al. | 359/117 |
| 5,809,190 A | 9/1998 | Chen | 385/43 |
| 5,867,291 A * | 2/1999 | Wu et al. | 359/124 |
| 6,243,200 B1 * | 6/2001 | Zhou et al. | 359/497 |

OTHER PUBLICATIONS

Wavelength–Division Multiplexer/DeMultiplexer, by P. Melman et al., May 23, 1985.
Flat Passband Birefringent Wavelength–Division Multiplexers, by W. J. Carlsen et al., Nov. 25, 1986.
Wavelength–Division MultiDumultiplexer Utilizing Optically Active Crystals, by Yohji Fujii et al., Journal of Lightwave Technology, vol. 8, No. 7, Jul. 1990.
Fiber–Optic Communication in the Wavelength–Division Multiplex Mode by H. F. Mahlein, Fiber and Integrated Optics, vol. 4,.
Review and Status of Wavelength–Division–Multiplexing Technology and Its Application by Hideki Ishio et al., Journal of Lightwave.
Devices for Wavelength Multiplexing and DeMultiplexing by J.M. Senior, et al., IEEE Proceedings, vol. 136, Pt. J, No. 3, Jun. 1989.
A Four–Channel Optical Waveguide Multi/Demultiplexer for 5–GHz Spaced Optical FDM Transmission—Kyo Inoue et al., Journal of Lightwave Technology, vol. 6, No. 2, Feb. 1988.

(List continued on next page.)

*Primary Examiner*—Audrey Chang
*Assistant Examiner*—Craig Curtis
(74) *Attorney, Agent, or Firm*—Baker Botts L.L.P.

(57) ABSTRACT

The inventive filter forms a four filtering stage device from two filtering stages and a reflective stage. This greatly reduces the noise level in a WDM signal, wherein the signal is one of the odd channels and the even channels, while the noise is present on the other of the odd channels and the even channels. The first stage separates the WDM signal and noise into their polarization components, rotates the components of one of the signal and the noise, and recombines the components of the signal, while blocking a portion of the noise. This output is passed to the second stage which repeats the operation of the first stage. The output of the second stage is then reflected by the reflecting stage back to the second stage, and subsequently the first stage, for processing in reverse order. The inventive filter, via the mirror in the reflecting stage, reduce dispersion of the light during processing.

29 Claims, 9 Drawing Sheets

OTHER PUBLICATIONS

Analysis of a Tunable Multichannel Two–Mode–Interference Wavelength Division Multiplexer/Demultiplexer—Youngchul Chung et al., Journal of Lightwave Technology, vol. 7, No. 5, May 1989.

Efficient Architectures for Exactly Realizing Optical Filters with Optimum Bandpass Designs—C. K. Madsen, IEEE Photonics Technology Letters, vol. 10, No. 8, Aug. 1998.

Optical FDM Transmission Technique—Kiyoshi Nosu et al., Journal of Lightwave Technology, vol. LT–5, No. 9, Sep. 1987.

Properties of a Novel Noncascaded Type, Easy–to–Design, Ripple–Free Optical Bandpass Filter—Benjamin Dingel, Journal of Lightwave Technology, vol. 17, No. 8, Aug. 1999.

A Multiport Frequency Band Selector with Inherently Low Loss, Flat Passbands, and Low Crosstalk; C.K. Madsen, IEEE Photonics Technology Letters, vol. 10, No. 12, Dec. 1998.

Optical Wave–Front Transformer Using the Multiple–Reflection Interference Effect Inside a Resonator; Benjamin Dingel and Masayuki Izutsu, Optics Letters, vol. 22, No. 19, Oct. 1, 1997.

Multifunction Optical Filter With a Michelson–Gires–Tournois Interferometer for Wavelength–Division–Multiplexed Network System Applications; Optics Letters, vol. 23, No. 14, Jul. 15, 1998.

A General Planar Waveguide Autoregressive Optical Filter; C. K. Madsen and Jian Zhao, Journal of Lightwave Technology, vol. 14, No. 3, Mar. 1996.

Optical All–Pass Filters for Phase Response Design with Applications for Dispersion Compensation; C.K. Madsen and G. Lenz, IEEE Photonics Technology Letters, vol. 10, No. 7, Jul. 1998.

* cited by examiner

WIDE TRANSMISSION OPTICAL COMB FILTER WITH WIDE PASS BAND AND WIDE STOP BAND

RELATED APPLICATIONS

The present application relates to U.S. Provisional Application No. 60/201,648, entitled "WIDE TRANSMISSION OPTICAL COMB FILTER WITH WIDE PASS BAND AND WIDE STOP BAND," filed May 1, 2000; U.S. Pat. No. 5,694,233, entitled "SWITCHABLE WAVELENGTH ROUTER," issued Dec. 2, 1997; U.S. patent application Ser. No. 09/411,935, entitled "OPTICAL WAVELENGTH ROUTER," filed Oct. 4, 1999; U.S. patent application Ser. No. 09/469,336, entitled "DISPERSION COMPENSATION/REDUCTION FOR OPTICAL SYSTEMS," filed Dec. 20, 1999; and U.S. patent application Ser. No. 09/447,091, entitled "MULTI-WAVELENGTH CROSS-CONNECT OPTICAL NETWORK," filed Nov. 22, 1999; which are hereby incorporated herein by reference.

TECHNICAL FIELD

The present application relates in general to optical communications, and in specific to using a wavelength filter in wavelength division multiplex communications.

BACKGROUND

Optical wavelength division multiplexing has gradually become the standard backbone network for fiber optic communication systems. WDM systems employ signals consisting of a number of different wavelength optical signals, known as carrier signals or channels, to transmit information over optical fibers. Each carrier signal is modulated by one or more information signals. As a result, a significant number of information signals may be transmitted over a single optical fiber using WDM technology. These optical signals are repeatedly amplified by erbium-doped fiber amplifiers (EDFA) along the network to compensate for transmission losses. The amplified signals reach the receiving end and are detected using WDM filters followed by photo receivers.

Fiber optic communications networks are typically arranged with a plurality of terminals in any of a number of topological configurations. The simplest configuration is two terminals communicating data over an optical link. This can be extended to a daisy-chain configuration in which three or more terminals are connected in series by a plurality of optical links. Ring configurations are also used, as well as other two-dimensional mesh networks. In each case, the optical link between two terminals typically includes a plurality of optical fibers for bidirectional communications, to provide redundancy in the event of a fault in one or more of the optical fibers, and for future capacity.

Despite the substantially higher fiber bandwidth utilization provided by WDM technology, a number of serious problems must be overcome, for example, multiplexing, de-multiplexing, and routing optical signals, if these systems are to become commercially viable. The addition of the wavelength domain increases the complexity for network management because processing now involves both filtering and routing. Multiplexing involves the process of combining multiple channels (each defined by its own frequency spectrum) into a single WDM signal. De-multiplexing is the opposite process in which a single WDM signal is decomposed into individual channels or sets of channels. The individual channels are spatially separated and coupled to specific output ports. Routing differs from de-multiplexing in that a router spatially separates the input optical channels to output ports and permutes these channels according to control signals to create a desired coupling between an input channel and an output port.

Note that each carrier has the potential to carry gigabits of information per second. Current technology allows for about forty channels or optical carriers, each of a slightly different wavelength, to travel on a single-mode fiber using a single WDM signal. The operating bands are limited by the EDFA amplifier (C) band, thus the increase in the number of channels has been accomplished by shrinking the spacing between the channels, and by adding new bands. The current standard is 50 and 100 GHz between optical channels, whereas older standards were 200 and 400 GHz spacings. Another characteristic of the WDM signal is the modulation rate. As the modulation rate is increased, more data can be carried. Current technology allows for a modulation rate of 10 Gigabits per second (Gbs). This has been recently increased from 2.5 Gbs. The 10 Gbs standard is SONET OC-192, wherein SONET is synchronized optical network and OC is optical carrier. The increase in the modulation rate translates into a wider signal in the spatial domain. Consequently, the wider signal and smaller spacing means that the signals are very close together (in the spatial domain), and thus are very hard to separate. As a result, crosstalk may occur from adjacent signals.

Figure 1A:
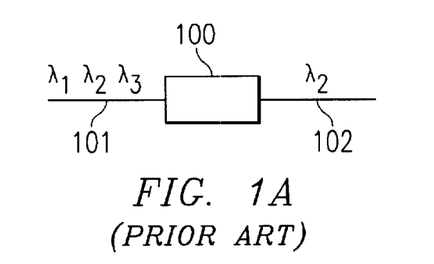
FIGS. 1A–1D depict prior art filters that isolate a single wavelength from an input signal.
Figure 1B:
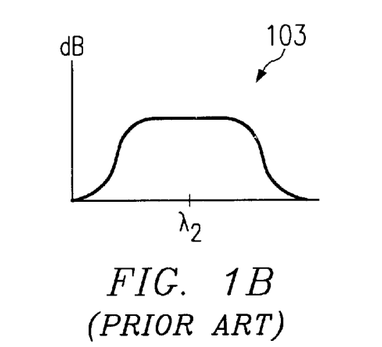
Figure 1C:
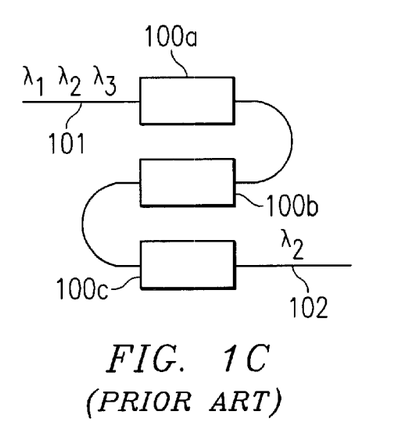
Figure 1D:
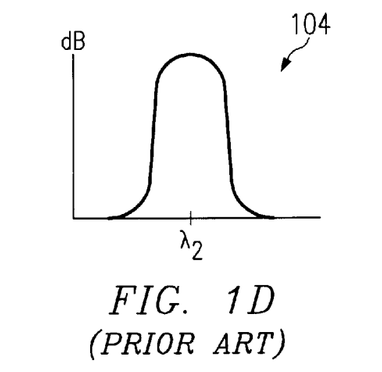

One prior art separation method is to use a Fourier based filter to pass a particular wavelength from the input signal and block the other wavelengths on the signal. Such a filter 100 is depicted in FIG. 1A, wherein the filter 100 receives a WDM signal 101, which comprises $\lambda 1$, $\lambda 2$, and $\lambda 3$. The filter 100 blocks $\lambda 1$ and $\lambda 3$, and passes $\lambda 2$ as output signal 102. The filter 101 has the transmission characteristics 103 shown in FIG. 1B. Note that this filter 101 has a low peak to valley ratio, i.e. the peak is not much higher than the floor. Thus, filter will have a low signal-to-noise ratio. To provide a higher signal-to-noise ratio, several identical filters 100a, 100b, 100c, can be cascaded together as shown in FIG. 1C. These filters also receive WDM signal 101, which comprises $\lambda 1$, $\lambda 2$, and $\lambda 3$, and blocks $\lambda 1$ and $\lambda 3$, while passing $\lambda 2$ as output signal 102. The cascaded filters 100a, 100b, 100c have the transmission characteristics 104 shown in FIG. 1D. Note that the cascaded filters have a higher peak-to-valley ratio than the single filter of FIG. 1A. Thus, the cascaded filters will have higher (better) signal-to-noise ratio. However, also note that this filter has a narrower width than the filter of FIG. 1A, thus this arrangement has better isolation but at a cost of having a narrower pass band.

Figure 2A:
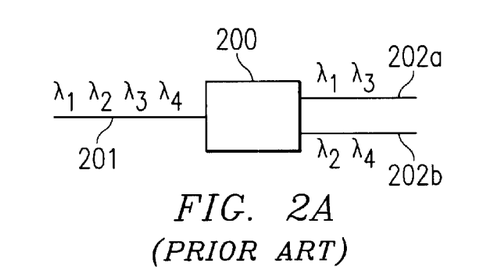
FIGS. 2A–2D depict prior art filters that separate multiple wavelength input signals into odd/even sub-signals.
Figure 2B:
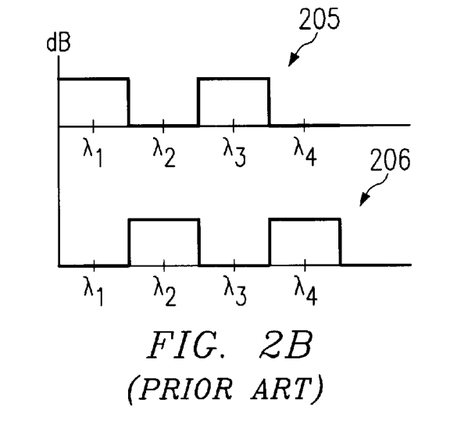
Figure 2C:
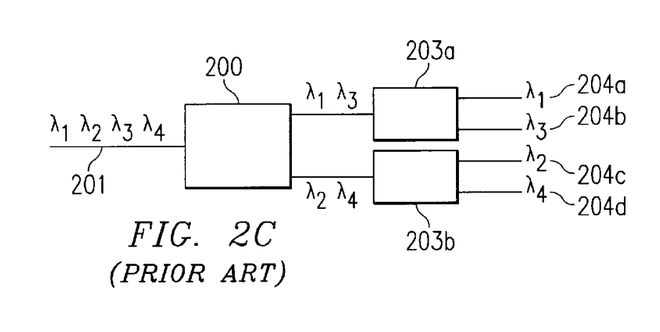
Figure 2D:
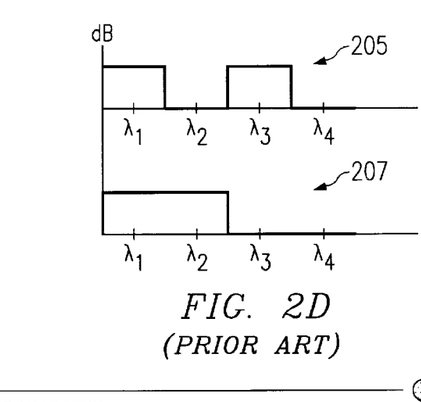

Another prior art separation method is to use a Fourier based filter to divide the input signal into two periodic, inter-digitated sub-signals, each carrying an odd or even set of alternating wavelength signals, see Cohen et al. U.S. Pat. No. 5,680,490, which is hereby incorporated by reference. As shown in FIG. 2A, the WDM input signal 201 comprises a plurality of wavelengths, $\lambda 1$, $\lambda 2$, $\lambda 3$, and $\lambda 4$. The filter 200 separates the input signal 201 into two sub-signals, which have complementary, inter-digitated wavelengths, one signal 202a with the odd wavelengths, $\lambda 1$ and $\lambda 3$, and the other signal 202b with the even wavelengths $\lambda 2$ and $\lambda 4$. Note that even and odd do not literally mean even and odd numbers, but rather indicate that alternating wavelengths in the input stream are separated into two streams. This usage will become apparent in the discussion of FIG. 2C. The filter 200 has the transmission characteristics 206 and 207, for outputs 202a and 202b respectively, as shown in FIG. 2B. Several filters can be cascaded to isolate single wavelengths, as shown in FIG. 2C. The second stage filters 203a, 203b have pass bands that are twice the size of first stage filter 200, as shown in FIG. 2D, which depicts characteristic 205 which corresponds to signal 202a, and characteristic 207 which corresponds to signal 204a of filter 203a. Note that the other characteristics of filters 203a and 203b are not shown for the sake of simplicity.

These filters all suffer from several types of problems. Among the problems are polarization dependant loss (PDL), polarization mode dispersion (PMD), and chromatic dispersion within a passband. PDL occurs when light of an unknown polarization is launched into a fiber or device and changes to a different polarization at the output end, which causes noise or loss as the polarization orientation is not matched to that of the system. For example, if the light starts with horizontal polarization and changes to vertical polarization, a different insertion loss may occur. Too large of a loss will compromise system performance. PMD is a type of dispersion that occurs when the polarization components of a light beam each experience a different index of refraction. Thus, one component travels faster than the other component. Chromatic dispersion within a passband is a similar problem caused by structure of this fourier filter to achieve square-like band shape. Thus, some spectral content of the light will travel faster than other portions of the light.

These problems greatly limit the performance of the prior art filters, and thus inhibit their use in high speed, dense signal systems.

SUMMARY OF THE INVENTION

These and other objects, features and technical advantages are achieved by a system and method which uses two filtering stages and a reflective stage to reflected the output of the second stage back into the two stage for reverse processing by the elements of the two stages. The inventive system and method filter noise from a WDM signal, wherein the signal is one of the odd channels and the even channels, while the noise is present on the other of the odd channels and the even channels.

The first stage comprises a birefringent element for separating the WDM signal into its polarization components. The noise is also broken into its polarization components. These components are sent into stacked set of waveplates, which via Fourier transforms, rotates the components of one of the signal and the noise. The output from the stack is passed to another birefringent element which combines the components of the signal and filters out the components of the noise. However, some noise leaks through and is recombined with the signal.

The second stage comprises elements similar to the first stage, and has a birefringent element that receives the output from the first stage and separates the signal and noise into their polarization components. These components are sent into a second stacked set of waveplates, which rotates the components of one of the signal and the noise. The output from the stack is passed to another birefringent element which combines the components of the signal and filters out the components of the noise. However, some noise leaks through and is recombined with the signal.

The reflecting stage receives the output from the second stage, reverses the polarizations of the output, and reflected the reversed polarization output back to the second stage, which then reverse processes the output and passes the processed output back to the first stage, which also reverse processes the signal and sends the final signal out of the filter.

Thus, the inventive filter, via the mirror in the reflecting stage, removes the dispersion problems of the prior art. The mirror causes the light to make two passes through the filtering stages, a forward pass and a reflected pass. The elements of the filter are arranged such that the polarization components of the light are reversed in each pass. This reduces polarization mode dispersion. The filter is also arranged such that the light in each of the polarization components follows different paths in each pass, such that in a round trip, each component of the light has traveled through the same portions of the elements of the filter. This reduces PDL and PMD. Each of the stages can be constructed such that each stage has a different slope, i.e. one stage has a positive slope and the other stage has a negative slope. The different slopes will cancel dispersion, see U.S. patent application Ser. No. 09/469,336, entitled "DISPERSION COMPENSATION/REDUCTION FOR OPTICAL SYSTEMS," which is hereby incorporated herein by reference.

The profile of the frequency response characteristics of the stack are essentially square-waves, which provide high isolation between the peaks and a higher dynamic range. The reflection stage forms a four stage device from two stages. The effect four stages is to greatly reduce the noise of the system and a high modulation depth of the output. In other words, the level of noise greatly reduced as compared to the level of signal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

A WDM signal consists of multiple channels with each channel having its own range of wavelengths or frequencies. As used herein, the terms "channel" or "spectral band" refer to a particular range of frequencies or wavelengths that define a unique information signal. Each channel is usually evenly spaced from adjacent channels, although this is not necessary. For example, the wavelength slicers shown in FIG. 2 can separate channels based on a 50 GHz spacing between adjacent channels. Uneven spacing may result in some complexity in design, but, as will be seen, the present invention can be adapted to such a channel system. This flexibility is important in that the channel placement is driven largely by the technical capabilities of transmitters (i.e., laser diodes) and detectors and so flexibility is of significant importance.

Figure 3A:
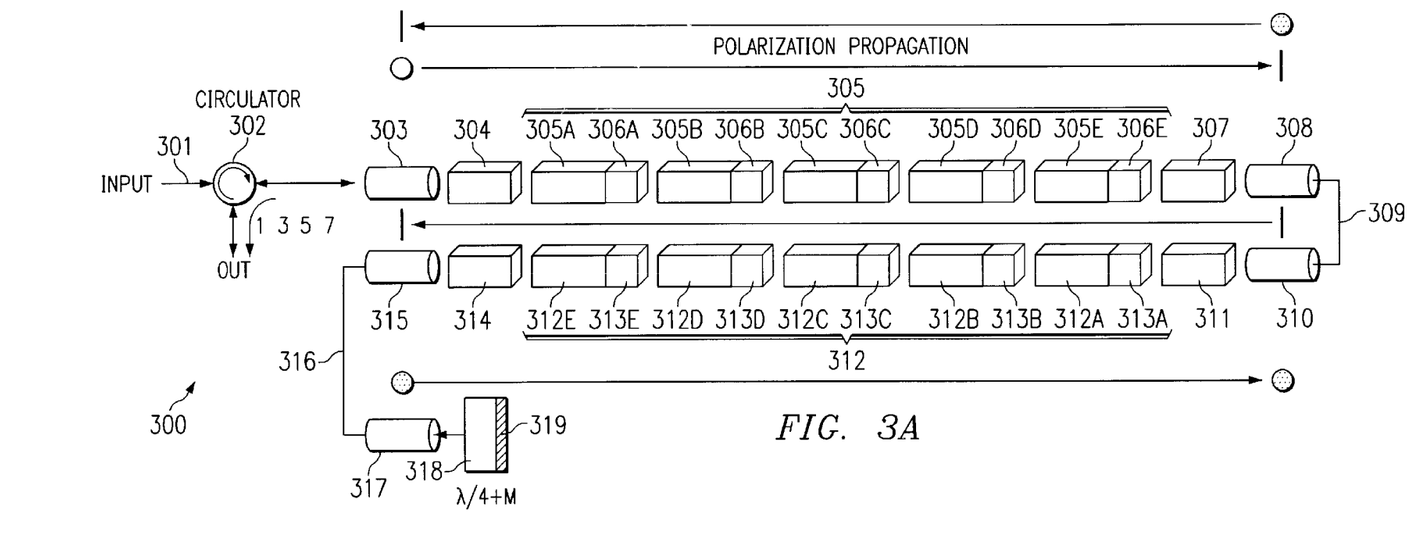
FIGS. 3A–3B depicts the elements of the inventive filter and light flow through the filter, FIG. 4 deipcts an alternative arrangement of the elements of FIG. 3B.
Figure 3B:
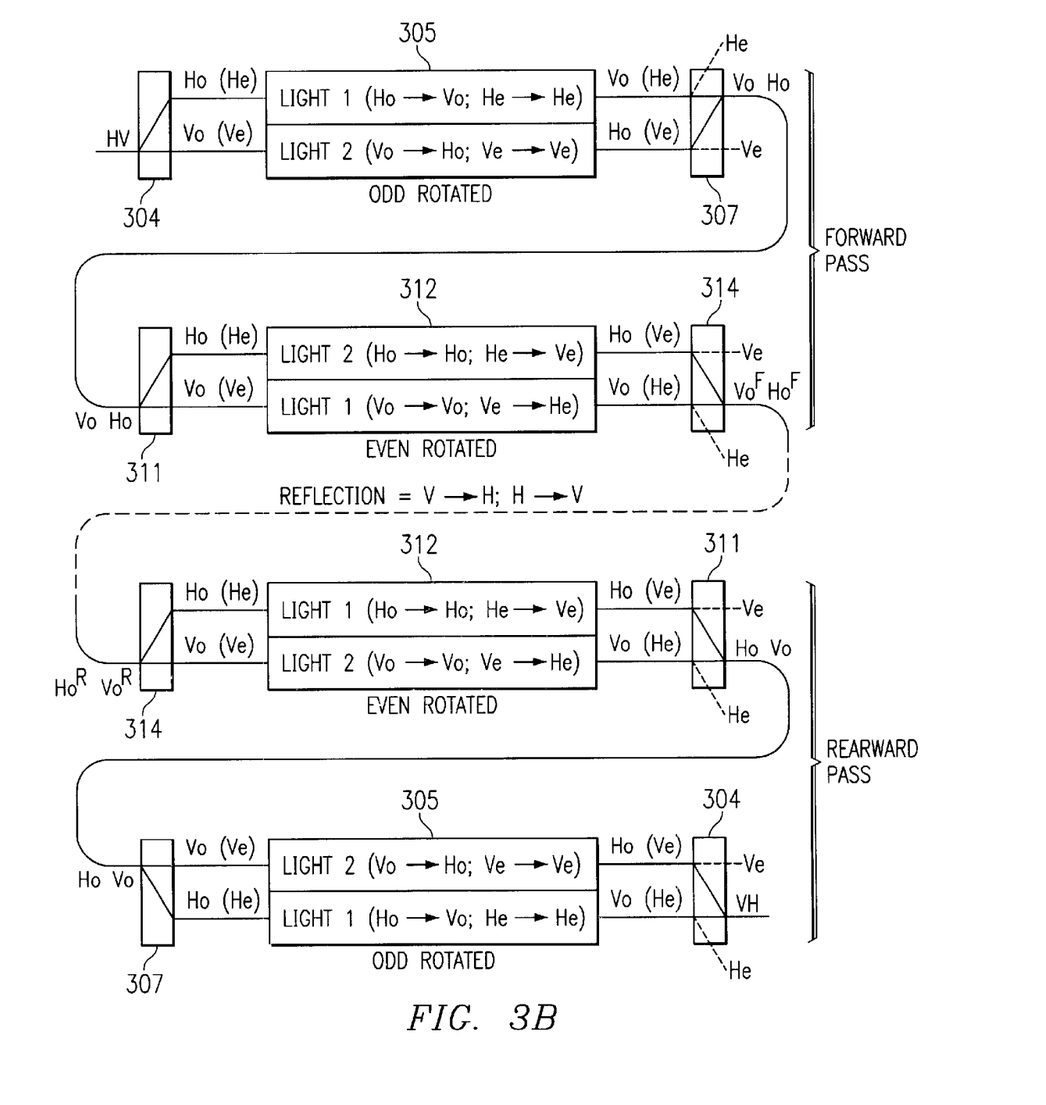

FIG. 3A is a detailed schematic diagram of a wavelength filter 300. FIG. 3B depicts the path and polarization changes of the light as it passes through the filter 300. The light input signal 301 entering the filter 300 is a WDM signal comprising both horizontal and vertical polarization components. Horizontal polarization, or p polarization, may be depicted as "p", "|", or a horizontal double-headed line. Vertical polarization, or s polarization, may be depicted as "s", "•", or a vertical double-headed line. Mixed polarizations may be depicted as "s/p", "p/s", "┼", or both horizontal and vertical double-headed lines.

For purposes of example only, assume that the light signal 301 comprises information on channels $\lambda 1, \lambda 3, \lambda 5, \lambda 7, \ldots$, i.e. the odd channels, while noise is present on channels $\lambda 2, \lambda 4, \lambda 6, \lambda 8, \ldots$, i.e. the even channels.

Note that the filter, is a single port device, i.e. the light enters and leaves the device through the same port. Thus, a system using the filter would utilize a light separator to physically separate the light paths of the input and output lights. This separator could be either integral with the filter or separate from the filter. As shown in FIG. 3A, a circulator 302 is used as the input/output light separator, however other types of separators could be used. As shown in FIG. 3B, the output of the filter, VH, has a polarization opposite that of the input, HV.

The input signal 301 is collimated by collimator 303, and enters the first birefringent element 304, which spatially separates horizontal and vertically polarized components of the input signal. The type of element is known as a beam displacer. The first birefringent element 102 comprises a material that allows the vertically polarized portion of the input signal to pass through without changing course because they are ordinary waves in the birefringent element 102. In contrast, horizontally-polarized waves are redirected at an angle because of the birefringent walk-off effect. The angle of redirection is a well-known function of the particular materials chosen. Examples of materials suitable for construction for all of the birefringent elements of the filter (e.g. 304, 305, 306, 307, 311, 312, 313, and 314) include calcite, rutile, lithium niobate, YVO4-based crystals, other crystalline materials, and the like. Note that the horizontal component comprises both information (odd) and noise (even), i.e. Ho and He, respectively. Also note that the vertical component comprises both information (odd) and noise (even), i.e. Vo and Ve, respectively.

The two components then enter stacked waveplate element 305, which is an optical birefringent element. As shown in FIG. 3B, the horizontally-polarized component travels along the upper path and the vertically polarized component travels along the lower path. Note that the designation of "upper" and "lower" for the paths is to only to allow visual correspondence with the depiction of the FIGURES and is not meant for actual orientation of the filter as the filter may be oriented in any manner. Also note that the light that originally forms the portion of the horizontal component Ho, will undergo various polarization changes as it passes through the filter, this in turn cause the light to travel through different portions of the filter. Similarly, the light that originally forms the portion vertical component Vo will also undergo various polarization changes as it passes through the filter, and will travel through different portions of the filter. Consequently, to better understand the flow of light through the filter, the portion of light including Ho that exits element 304 and enters waveplates 305 is labeled Light1 in FIG. 3B, and the portion of light including Vo that exits element 304 and enters the first set of waveplates 305 is labeled Light2.

The stacked waveplates element 305 is a stacked plurality of birefringent waveplates (305a . . . 305e) at selected orientations that generate two eigen states. The first eigen state carries a first set of channels with the same polarization as the input, and the second eigen state rotates a complementary set of channels to a polarization that is orthogonal to the input. In other words, the waveplates are designed to rotate the polarization of one of the odd wavelengths ($\lambda 1, \lambda 3, \lambda 5, \lambda 7, \ldots$) and the even wavelengths ($\lambda 2, \lambda 4, \lambda 6, \lambda 8, \ldots$). Element 305 has its waveplates aligned to rotate the odd wavelengths and pass the even wavelengths. Thus, for light1 Ho is rotated to Vo, while He remains He. The upper output from element 305 is then VoHe, wherein Vo is the information and He is the noise. For light2, Vo is rotated to Ho, and Ve remains Ve. Thus, the lower output from element 305 is then HoVe.

The upper and lower outputs from element 305 are incident onto second birefringent element 307. This birefringent element 307 has a similar construction to the first birefringent element 304 and spatially recombines the horizontally and vertically polarized components of the odd wavelengths. The lower output comprises HoVe, thus the Ve portion will pass through the element 307 and not impinge on the collection point of the fiber 309, while the Ho portion will be deflected to the collection point of fiber 309 via the walk-off effect of element 307. Thus, the information is collected while the noise is removed. Similarly, the upper output comprises VoHe, thus the He noise portion is deflected upward, away from the collection point, while the Vo information portion passes through the element to the collection point. Thus, the signal reaching the collection point of the fiber is VoHo, or the information, and the noise, VeHe, is filtered or separated from the information.

After recombination by the birefringent element 307, the light is passed to collimator 308 which inputs the light into fiber 309. This fiber is a polarization maintaining fiber, and thus the polarizations of the light components are not changed by passage through this fiber. The fiber 309 then couples the light into collimator 310, which collimates the light and passes the light to the third birefringent element 311.

The third birefringent element 311 is of a similar construction to the first and second birefringent elements 304, 307, and spatially separates horizontal and vertically polarized components of the input signal. Again, the birefringent element 311 passes vertically polarized light without changing direction, and redirects horizontally polarized light at an angle because of the birefringent walk-off effect. Note that the input to element 311 is essentially VoHo that exited the second element 307, however even channel light (noise) is still present, though greatly reduced (e.g. about 20 dB), by the actions of elements 304, 305, and 307. Thus, the horizontal component comprises both information (odd) and noise (even), i.e. Ho and He, respectively and the vertical component comprises both information (odd) and noise (even), i.e. Vo and Ve, respectively. This light then enters the second set of stacked waveplates 312.

The second set of stacked waveplates element 312 is of a similar construction to that of first set of plates 305. However, this set of stacked waveplates are designed to rotate the polarization of the even wavelengths ($\lambda 2, \lambda 4, \lambda 6, \lambda 8, \ldots$) and pass the odd wavelengths ($\lambda 1, \lambda 3, \lambda 5, \lambda 7, \ldots$). Thus, for light1 Vo remains Vo, while Ve is rotated to He. The lower output from element 312 is then VoHe, wherein Vo is the information and He is the noise. For light2, Ho remains Ho, and He is rotated to Ve. Thus, the upper output from element 312 is then HoVe. The upper and lower outputs from element 312 are incident onto fourth birefringent element 314.

This birefringent element 314 has a similar construction to the other birefringent elements 304, 307, 311, and spatially recombines the horizontally and vertically polarized components of the odd wavelengths. The upper output comprises HoVe, thus the Ve portion will pass through the element 314 and not impinge on the collection point of the fiber 316, while the Ho portion will be deflected to the collection point of fiber 316 via the walk-off effect of element 314. Thus, the information is collected while the noise is removed. Similarly, the lower output comprises VoHe, thus the He noise portion is deflected downward, away from the collection point, while the Vo information portion passes through the element to the collection point. Thus, the signal reaching the collection point of the fiber 316 is VoHo, or the information, and the noise, VeHe, is filtered or separated from the information.

After recombination by the birefringent element 314, the light is passed to collimator 315 which inputs the light into fiber 316. This fiber is a polarization maintaining fiber, and thus the polarizations of the light components are not changed by passage through this fiber. The fiber 316 then couples the light into collimator 317, which collimates the light for reflection.

The light exiting collimator 317 impinges on quarter-wave plate ($\lambda$/4) 318, which introduces a left-hand circular rotation on the light. The rotating light then impacts the mirror 319, and is reflected back as right-hand circularly rotating light. The right-hand light then passes through the quarter-wave plate 318 which removes the right-hand circulation. The net effect reflecting off of mirror 319 and passing through plate 318 twice is a 180 degree rotation of the polarization, as well as reversing the light flow on the light path. Thus, the forward Vf and Hf become reflected Hr and Vr, respectively.

The reflected light the passes back through the above elements in reverse order. FIG. 3B depicts the flow back through the elements of FIG. 3A by duplicating the elements. The reflected and rotated light is un-collimated by collimator 317 and travels through fiber 316, to collimator 315 where the light is collimated and provided to the fourth birefringent element 314.

The fourth birefringent element 314 spatially separates horizontal and vertically polarized components of the reflected signal. Again, the birefringent element 314 passes vertically polarized light without changing direction, and redirects horizontally polarized light at an angle because of the birefringent walk-off effect. Note that the input to element 314 is essentially VoHo that has been reflected back to itself, however even channel light (noise) is still present, though greatly reduced (e.g. about 20 dB). Thus, the horizontal component comprises both information (odd) and noise (even), i.e. Ho and He, respectively and the vertical component comprises both information (odd) and noise (even), i.e. Vo and Ve, respectively. This light then enters the second set of stacked waveplates 312.

The second set of stacked waveplates element 312 rotates the polarization of the even wavelengths ($\lambda 2, \lambda 4, \lambda 6, \lambda 8, \ldots$) and passes the odd wavelengths ($\lambda 1, \lambda 3, \lambda 5, \lambda 7, \ldots$). Thus, for light1 Ho remains Ho, while He is rotated to Ve. The upper output from element 312 is then HoVe, wherein Ho is the information and Ve is the noise. For light2, Vo remains Vo, and Ve is rotated to He. Thus, the lower output from element 312 is then VoHe. Note that the light portions light1 and light 2 are now traveling on the opposite paths than in the forward direction. Specifically, on the forward pass through element 312 (as well as elements 311 and 314), the light1 travels on the lower path. On the reflected pass through element 312, the light1 travels on the upper path. Similarly for light2. On the forward pass through element 312 (as well as elements 311 and 314), the light2 travels on the upper path. On the reflected pass through element 312, the light2 travels on the lower path. Thus, any dispersion introduced into a light portion traveling one path on the forward pass is also experienced by the other light portion on the reflected pass. Consequently, dispersion is nulled out.

The upper and lower outputs from element 312 are incident onto the third birefringent element 311, which spatially recombines the horizontally and vertically polarized components of the odd wavelengths. The upper output comprises HoVe, thus the Ve portion will pass through the element 311 and not impinge on the collection point of the fiber 309, while the Ho portion will be deflected to the collection point of fiber 309 via the walk-off effect of element 311. Thus, the information is collected while the noise is removed. Similarly, the lower output comprises VoHe, thus the He noise portion is deflected downward, away from the collection point, while the Vo information portion passes through the element to the collection point. Thus, the signal reaching the collection point of the fiber 309 is VoHo, or the information, and the noise, VeHe, is filtered or separated from the information.

After recombination by the birefringent element 311, the light is passed to collimator 310 which inputs the light into fiber 309. The fiber 309 then couples the light into collimator 308, which collimates the light for reception by the second birefringent element 307.

The second birefringent element 307 spatially separates horizontal and vertically polarized components of the input signal. Note that the input to element 307 is essentially VoHo that exited the third element 311, however even channel light (noise) is still present, though greatly reduced (e.g. about 20 dB). Thus, the horizontal component comprises both information (odd) and noise (even), i.e. Ho and He, respectively and the vertical component comprises both information (odd) and noise (even), i.e. Vo and Ve, respectively. This light then enters the first set of stacked waveplates 305.

The first set of stacked waveplates element 305 passes the polarization of the even wavelengths ($\lambda 1, \lambda 4, \lambda 6, \lambda 8, \ldots$) and rotates the odd wavelengths ($\lambda 1, \lambda 3, \lambda 5, \lambda 7, \ldots$). Thus, for light1 He remains He, while Ho is rotated to Vo. The lower output from element 304 is then HeVo, wherein Vo is the information and He is the noise. For light2, Ve remains Ve, and Vo is rotated to Ho. Thus, the upper output from element 304 is then HoVe. Note that the light portions light1 and light 2 are now traveling on the opposite paths than in the forward direction. Specifically, on the forward pass through element 305 (as well as elements 304 and 307), the light1 travels on the upper path. On the reflected pass through element 305, the light1 travels on the lower path. Similarly for light2. On the forward pass through element 305 (as well as elements 304 and 307), the light2 travels on the lower path. On the reflected pass through element 305, the light2 travels on the upper path. Thus, any dispersion introduced into a light portion traveling one path on the forward pass is also experienced by the other light portion on the reflected pass. Consequently, dispersion is nulled out.

The upper and lower outputs from element 305 are incident onto the first birefringent element 304, which spatially recombines the horizontally and vertically polarized components of the odd wavelengths. The upper output comprises HoVe, thus the Ve portion will pass through the element 311 and not impinge on the collection point of the fiber 301, while the Ho portion will be deflected to the collection point of fiber 301 via the walk-off effect of element 304. Thus, the information is collected while the noise is removed. Similarly, the lower output comprises VoHe, thus the He noise portion is deflected downward, away from the collection point, while the Vo information portion passes through the element to the collection point. Thus, the signal reaching the collection point of the fiber 301 is VoHo, or the information, and the noise, VeHe, is filtered or separated from the information.

After recombination by the birefringent element 304, the light is passed to collimator 303 which inputs the light into fiber 301.

Figure 4:
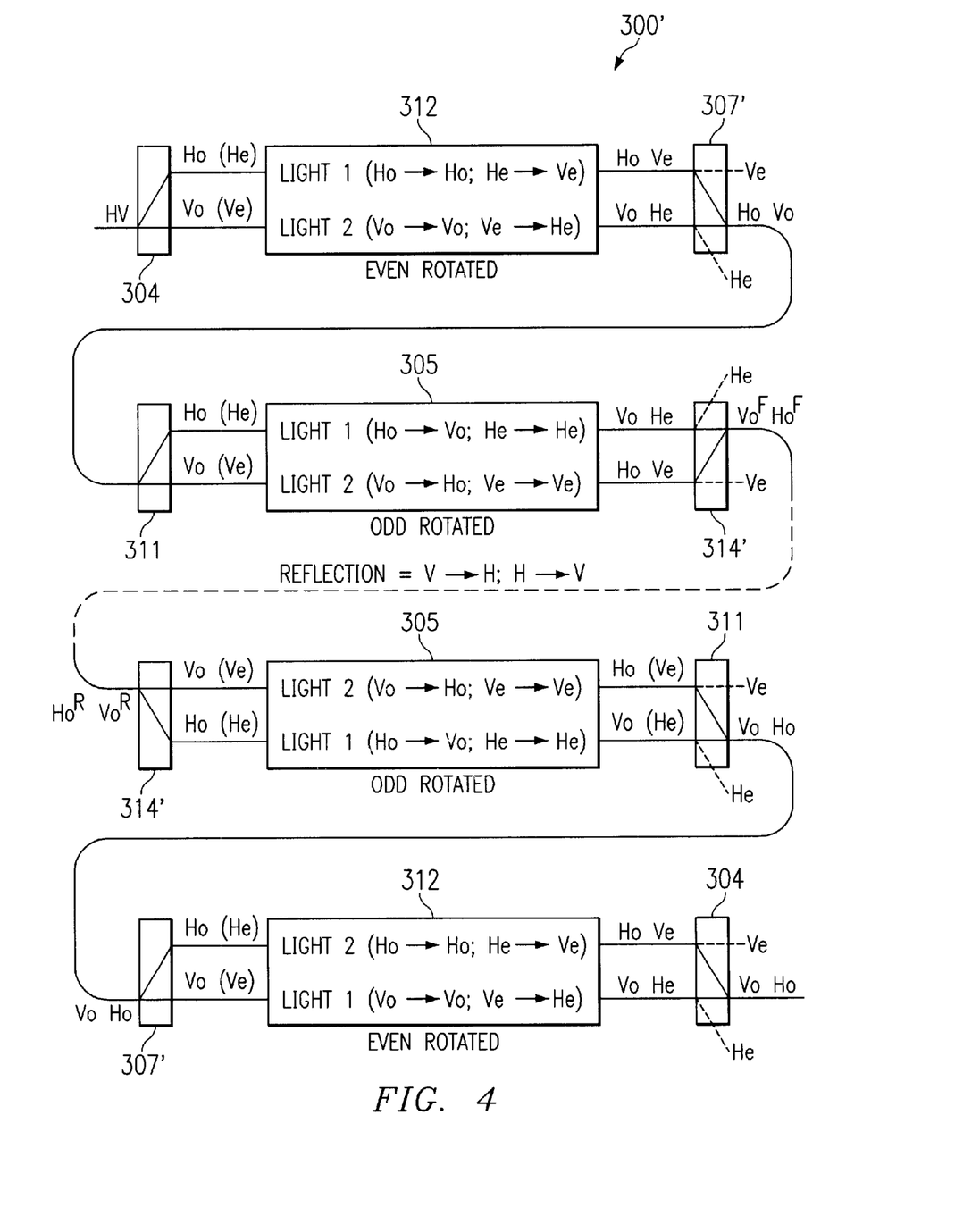

FIG. 4 depicts an alternative arrangement for the elements of FIG. 3B. The elements of FIG. 4 are the same as those of FIG. 3B, and thus their respective labeling is the same. However, note that the first set of waveplates element 305 and the second set of waveplates element 312 have their positions interchanged. Instead of the odd, even, even, odd rotation pattern of FIG. 3B, FIG. 4 has an even, odd, odd, even rotation pattern. Also note that birefringent elements 307 and 314 of FIG. 3B have been inverted in FIG. 4, and thus are labeled 307' and 314'. The arrangements of FIGS. 3A, 3B, and 4 are by way of example only, as by inverting various combinations of 304, 307, 311, and 314, and/or swapping positions of elements 305 and 312, different arrangements of filters 300 could be accomplished.

Figure 5:
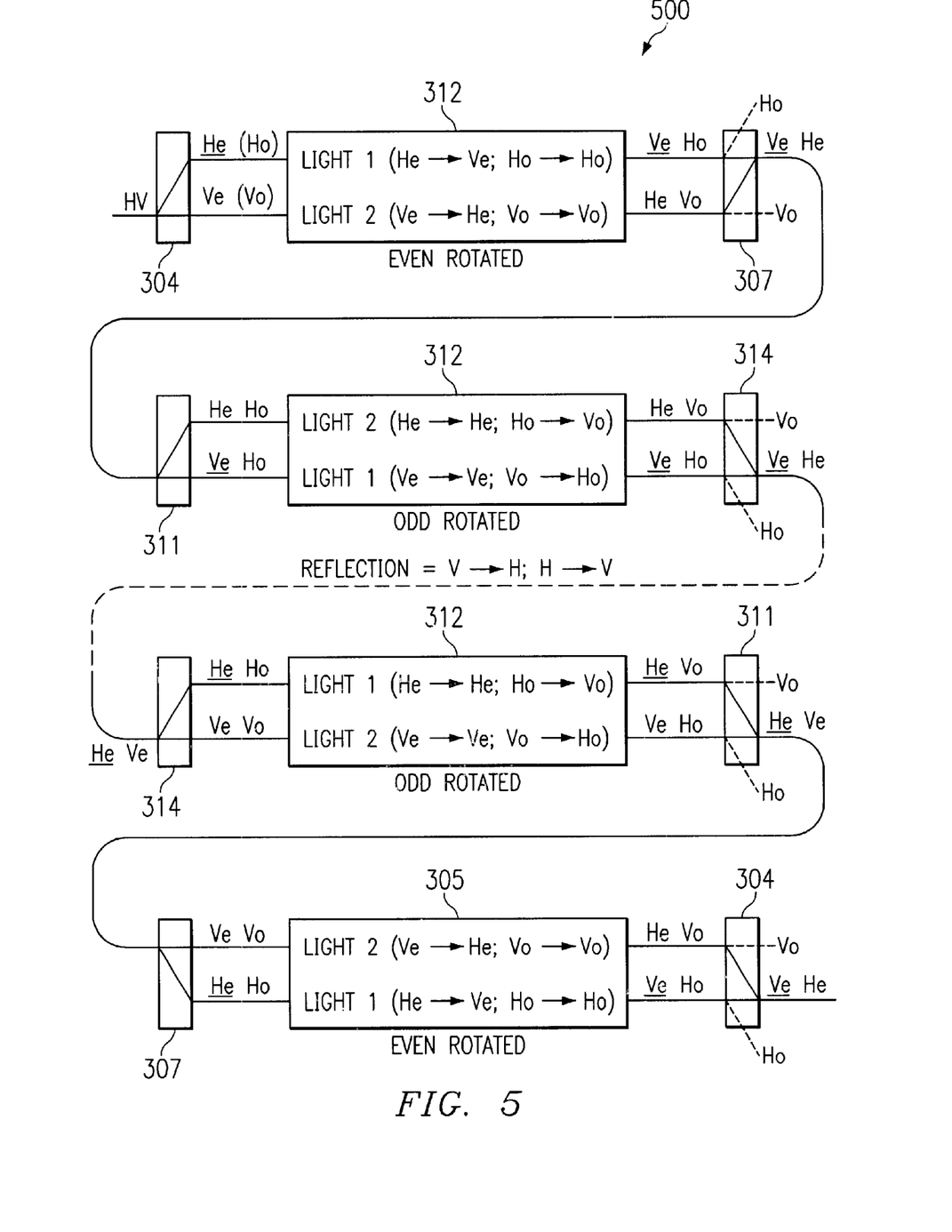
FIG. 5 depicts an arrangement of the element of FIG. 3B to provide even channel passing.

Also note that the above discussion has been limited to an odd pass filter 300, wherein the odd channels are passed, and the even channels are filter out. This presumes that the information is carried on the odd channels, while noise is carried on the even channels. However, a different arrangement of the elements of FIG. 3B would result in an even pass filter. An example of an even pass filter is shown in FIG. 5. The elements of FIG. 5 are the same as those of FIG. 3B, and thus their respective labeling is the same. However, note that the first set of waveplates element 305 and the second set of waveplates element 312 have their positions interchanged. Instead of the odd, even, even, odd rotation pattern of FIG. 3B, FIG. 5 has an even, odd, odd, even rotation pattern. This interchange cause the even channels to be collected and thus passed by the filter, and the odd channels to be filtered out. The arrangement of FIG. 5 is by way of example only, as by inverting various combinations of 304, 307, 311, and 314, and/or swapping positions of elements 305 and 312, different arrangements of filter 500 could be accomplished.

Figure 6:
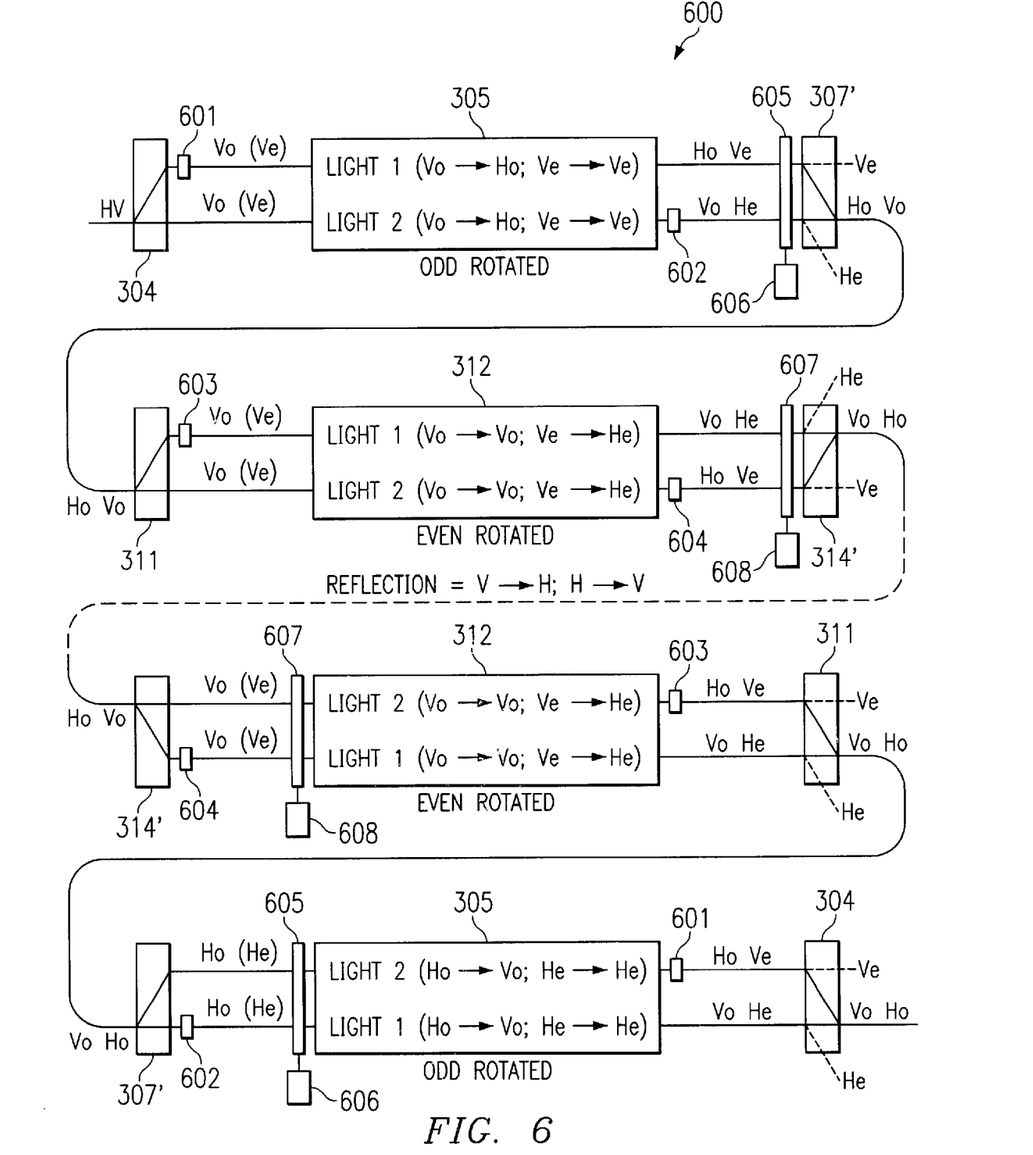
FIG. 6 depicts alternative embodiments for the inventive filter of FIG. 3B.

Note that polarization mode dispersion is reduced by the arrangement of elements in the inventive filter 300. In FIG. 3B, note that light 1 and light 2 pass through element 312 having vertical and horizontal polarizations, respectively, during the forward pass. And on the reflected pass, light 1 and light 2 pass through element 312 having horizontal and vertical polarizations, respectively. The different light portions experience similar polarizations traveling through element 305 during forward and reflected passes. For example, note that light1, on the forward pass, begins with horizontal polarization during entry into element 305 on the element 304 side of element 305. On the reflected pass, light1 completes passage through element 305 with vertical polarization on the 304 side of element 305. Light2 has similar compensation. Since each light portion experience both polarizations, then any dispersion introduced because of polarization is effectively nulled out. However, any imperfections in the quarter-wave plate 318 will lead to a small imbalance in the polarizations of the reflected light, and thus PMD may not be reduced enough. An alternative arrangement to remove PMD is shown in FIG. 6. The elements of FIG. 6 are the same as those of FIG. 3B, and thus their respective labeling is the same. However, note that birefringent elements 307 and 314 of FIG. 3B have been inverted in FIG. 6, and thus are labeled 307' and 314'. FIG. 6 uses half-wave plates 601, 602, 603, and 604 to change the polarization of light in the paths, such that the light portions entering elements 305 and 312 have same polarizations. As shown in FIG. 6, on the forward path, half-wave plate 601 has been placed on the upper path, and thus changed Ho and He into Vo and Ve, respectively. Thus the light entering element 305 is vertically polarized on both the upper and lower paths. Half-wave plate 602 is used to change Ho and Ve that has exited element 305 on the lower path into Vo and He, respectively. The halfwave plates are placed in complementary paths, i.e. one in the upper path and one in the lower path, to ensure the same optical path length is experienced by each light portion. Halfwave plates 603 and 604 perform operations on the light entering/leaving element 312. Note that the positions of plates 601, 602, 603, and 604 could be change. For example, plate 601 could be placed in the lower path, and plate 602 could be placed in the upper path. Similarly, plate 603 could be placed in the lower path, and plate 604 could be placed in the upper path. The half-wave plates of FIG. 6 can also be used the even pass filter of FIG. 5. Note that the arrangement of FIG. 6 is by way of example only, as by inverting various combinations of 304, 307', 311, and 314', and/or swapping positions of elements 305 and 312, different arrangements of filters 600 could be accomplished.

The above discussion has been limited to passive devices, which are devices that are fixed in function, and cannot be changed dynamically. Optionally, the filter could be used with controllable polarization rotators, which would change the polarizations of the light portions of the paths, and consequently control which channel is collected by the birefringent elements, i.e. the even channel or the odd channel. As shown in FIG. 6, polarization rotators 605 and 607 have been placed between elements 305 and 307' and elements 312 and 314'. The rotators 510 are used to control the polarization of the light in the light paths. The voltage applied to the rotators by the controllers 606 and 608 causes the light to either pass through un-rotated (15 volts) or rotated such that H becomes V and V becomes H (0 volts). For example, if the light incident onto the rotator 605 on the upper path is HoVe, and the rotator is set to rotate, then the output is VoHe, which upon encounter element 307' will cause the filtering of Vo and the collection of He. If the rotator is set to pass light, then the output will be HoVe, which upon encounter element 307' will cause the filtering of Ve and the collection of Ho. Thus, depending upon the setting of the rotators, the filter 600 can be used to pass one of the odd and even channels, and filter the other channel set. Note that the arrangement of FIG. 6 is by way of example only, as by inverting various combinations of 304, 307', 311, and 314', and/or swapping positions of elements 305 and 312, and/or moving the location of the rotators 605 and 607, different arrangements of filters 600 could be accomplished. The rotators of FIG. 6 can also be used the even pass filter of FIG. 5. The switchable polarization rotators 605 and 607 can be made of one or more types of known elements including parallel aligned liquid crystal rotators, twisted neumatic liquid crystal rotators, ferro electric liquid crystal rotators, pi-cell liquid crystal rotators, magnetooptic based Faraday rotators, acousto-optic and electro-optic polarization rotators. Commercially available rotators using liquid crystal based technology are preferred.

To ensure remove the effects of temperature on the filter, temperature compensation plates may be added to the filter as shown in FIG. 3A. The effects change the index of refraction (n), and hence change the optical path length (nl). The change in optical path length changes the wavelength characteristics of the filter. Each plate 305a, 305b, 305c, 305d, and 305e of element 305, has an associated temperature compensation waveplate 306a, 306b, 306c, 306d, and 306e. Each plate 312a, 312b, 312c, 312d, and 312e of element 312, has an associated temperature compensation waveplate 313a, 313b, 313c, 313d, and 313e. The temperature compensation plates operate to offset the changes in the index of refraction.

FIG. 3A also shows the filter having the stacked waveplates 305 and 312 comprising five individual plates. The more plates, the better the isolation and more square wave like the shape, but having more plates increases the cost and complexity of the filter. Five plates produces good results and is cost effective to manufacture.

Note that the collimators 308, 310, 315, and 317 are optional, as well as fibers 309 and 316. The arrangement shown in FIG. 3A is to allow the filter to fit into a physically smaller system. Otherwise, element 307 could be directly coupled to element 311, and element 314 could be directly coupled to quarter-wave plate 318. Also element 307 could be coupled to element 311 via a waveguide, and element 314 could be coupled to quarter-wave plate via a waveguide, and thus the collimators and the fibers would not be necessary.

PMD compensation is achieved by the same mechanism used in PDL compensation.

PDL compensation is achieved by swapping light paths between light 1 and light 2 when coupling back by the mirror and the quarter-waveplate.

The use of the mirror 319 provides a large advantage over the prior art. In order to achieve a high modulation depth, in other words in order to filter out enough noise, four stages would typically be needed, with each filtering out about 20 dB for a total of about 80 dB. Each of the stages would have to be precisely aligned with the other stages. If there is any misalignment, then the wavelength response characteristics would have more narrow peak and a broader base, which is undesirable as a square wave response profile is ideal. The invention only two stages and one mirror, which is much easier to align.

Figure 7:
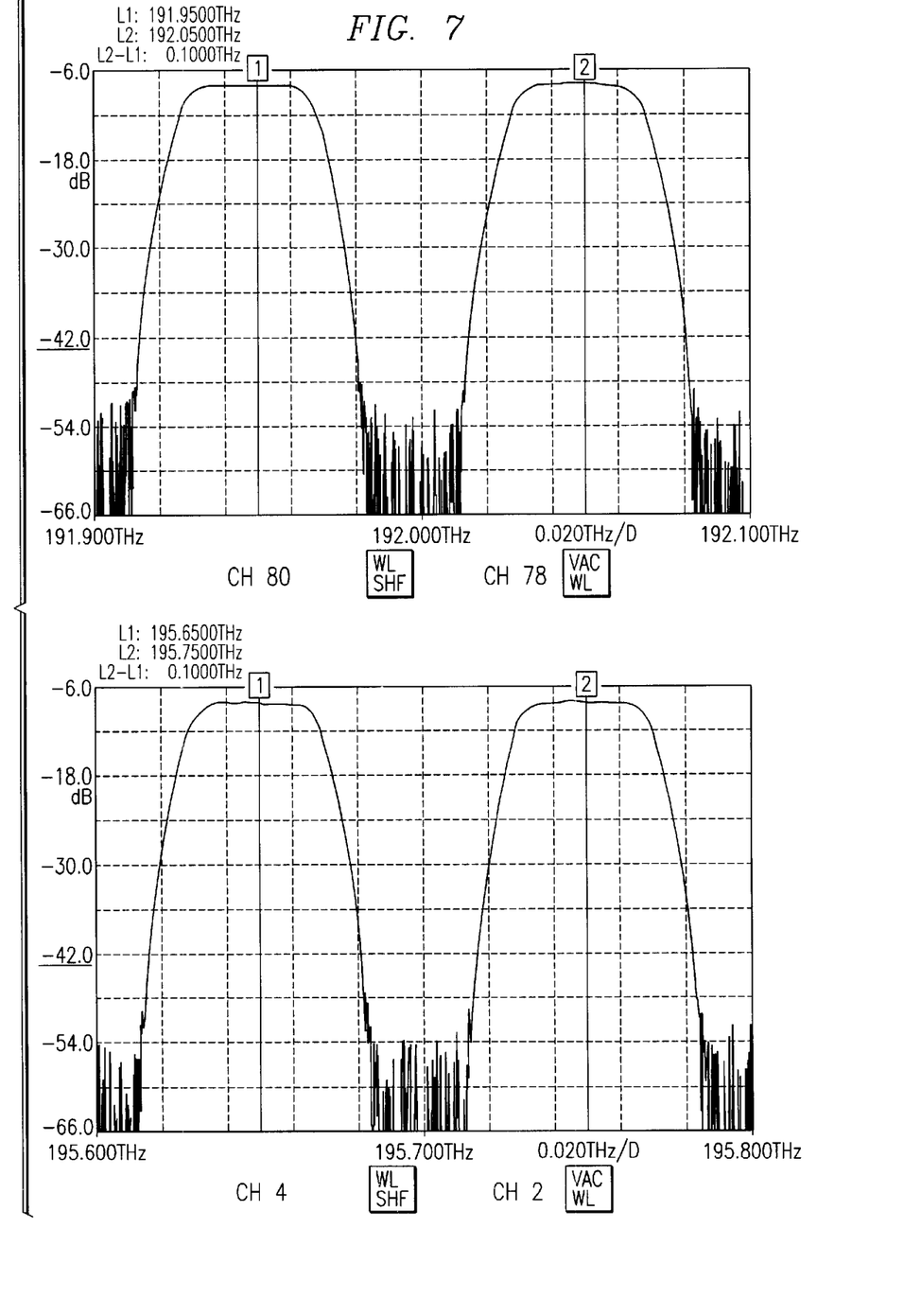
FIG. 7 depicts the frequency response for four channels of the inventive filter.
Figure 8:
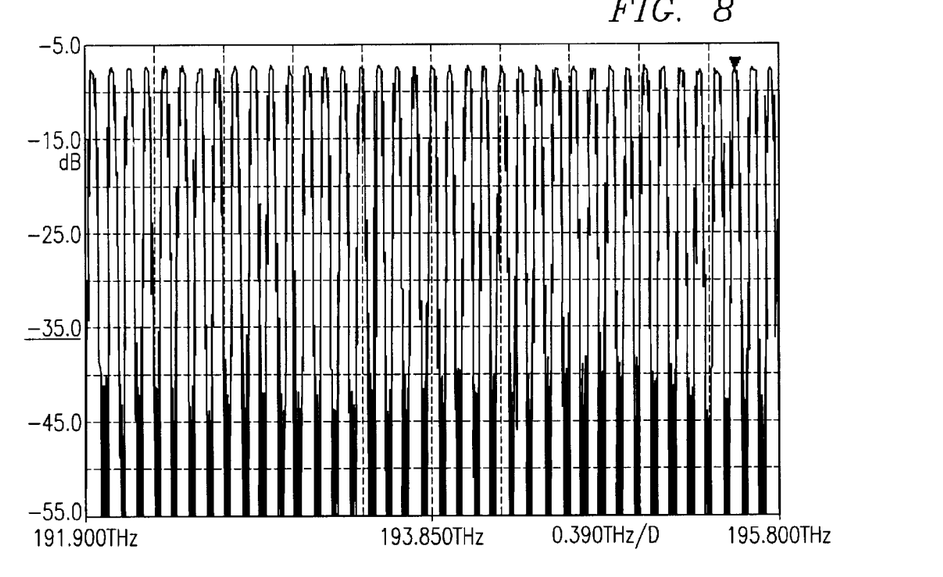
FIG. 8 depicts the frequency response for 39 channels of the inventive filter.

FIG. 7 depicts the frequency response for four channels. FIG. 8 depicts the frequency response for 39 channels.

Figure 9:
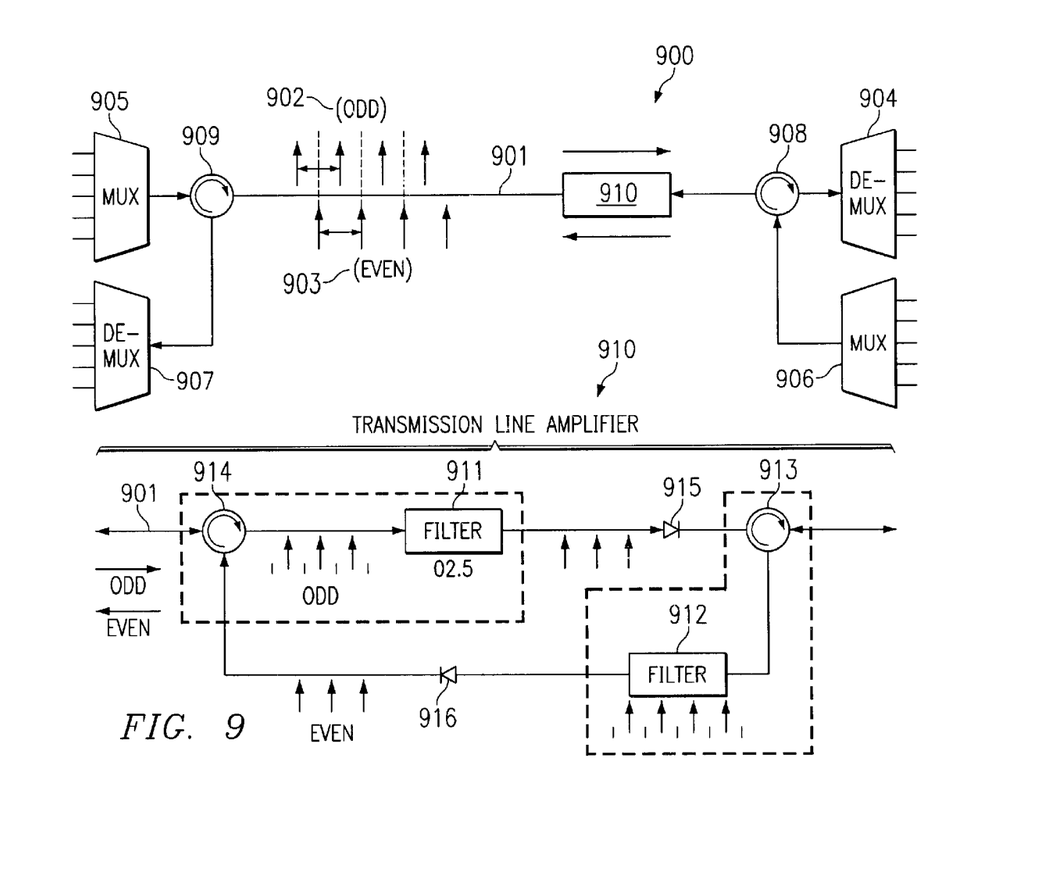
FIG. 9 depicts system using the inventive filter in a transmission line amplifier.

FIG. 9 depicts a use for the inventive filter. Note that the depicted system has been greatly simplified, as multiple instantiations of the depicted elements are present in actual systems. In a dense WDM network (DWDM) many channels, e.g. 80 or 160, may be combined onto a single fiber 901. Such networks are typically bidirectional, that is data is sent in both directions. Typically one signal 902 is sent in one direction with the odd channels and another signal 903 is sent in the other direction with the even channels. Such a network would have 100 GHz or 50 GHz spacing between the channels. Channels are coupled/decoupled with the fiber 901 via muxes 904, 905 and de-muxes 906, 907, and circulators 908 and 909. During transmission, the signals are amplified by amplifier 910. Thus, noise appearing on the 902 signal in the even channels should be filtered out prior to amplification, as well as noise appearing on the odd channels in the 903 signal, to prevent amplification of the noise, which may lead to a noise ratio problem. Thus the inventive filter would be incorporated into the transmission line amplifier. The even and odd signals would be separated from the transmission line 901 via circulators 913, 914. The odd signal 902 would be delivered into an odd pass filter 911, e.g. that shown in FIG. 3B, wherein the even channel noise is removed. The filtered signal is then amplified by amplifier 915 and coupled back onto fiber 901. Similarly, the even signal 903 would be delivered into an even pass filter 912, e.g. that shown in FIG. 5, wherein the odd channel noise is removed. The filtered signal is then amplified by amplifier 916 and coupled back onto fiber 901. Note that the filter may also be placed after amplification, as well as other locations with in the depicted system, e.g. after the circulators 909, 908. Multiple filters may be used at various locations in the system.

Figure 10:
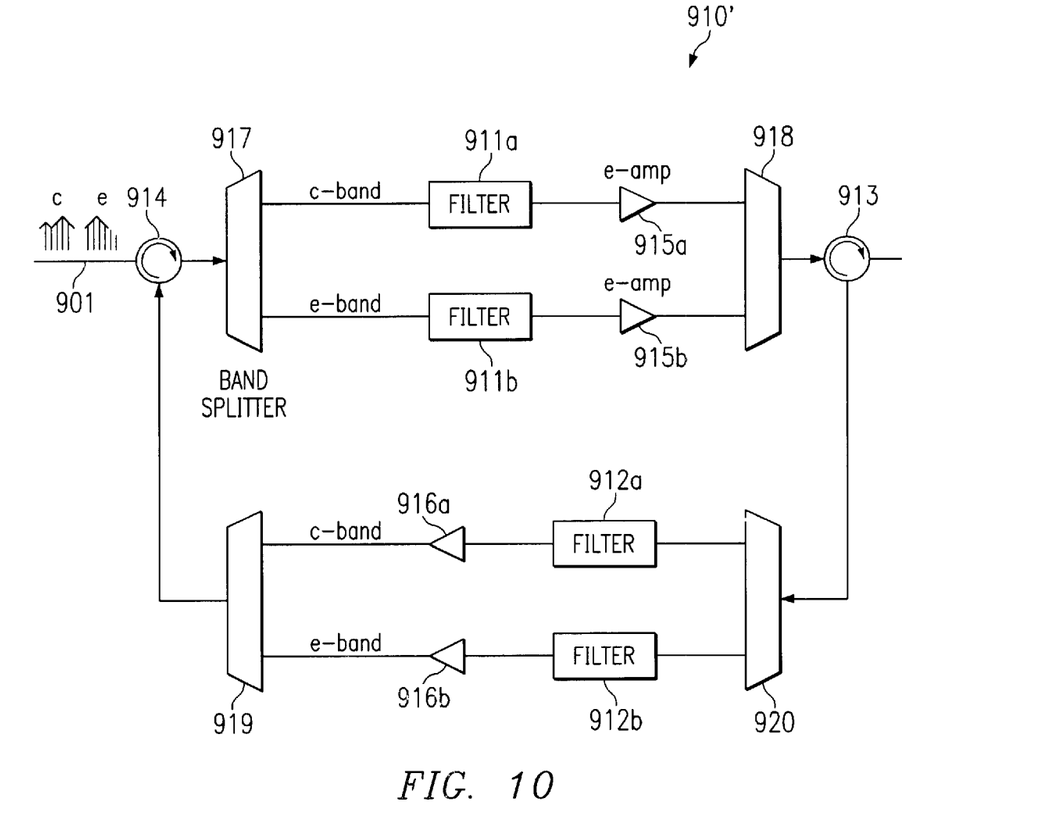
FIG. 10 depicts an alternative transmission line amplifier for the system of FIG. 9.

FIG. 10 depicts an alterative embodiment for the transmission line amplifier of FIG. 9, and similar elements have similar labels. In FIG. 10 the signals being amplified by transmission line amplifier 910' are comprised of multiple bands, specifically the c-band centered at 1550 nanometers and the e-band (or l-band) centered at 1585 nanometers. For such a system, multiple amplifiers must be used, one for each band. After being separated from the transmission line, a band-splitter 917,920 is used to separate the signal into channels of the different bands. The channels of each of the bands are passed to respective filters and amplifiers. Specifically, filter 911a and amplifier 915a are for the c-band odd channels, filter 911b and amplifier 915b are for the e-band odd channels, filter 912a and amplifier 916a are for the c-band even channels, and filter 912b and amplifier 916b are for the e-band even channels. The filters and amplifiers are specifically designed for their particular band. After amplification, band-combiners 918, 919 are used to combine the c-band and e-band odd channel signals and the c-band and e-band even channel signals, respectively. The combined signals are then coupled back onto fiber 901.

Figure 11:
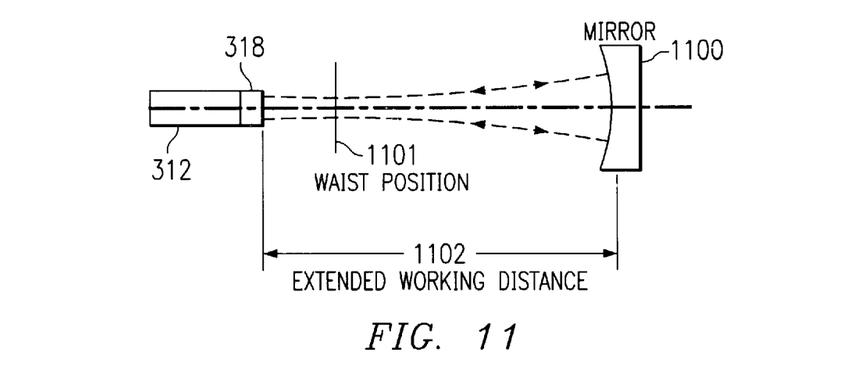
FIG. 11 depicts an alternative embodiment for the mirror component of filter of FIG. 3A.

Another embodiment of the present invention is to replace mirror 319 of FIG. 3A with a curved mirror 1100 as shown in FIG. 11. Note that the fiber 316 and collimators 315 and 317 may be removed, such that elements 318 and 319 may be directly connected to element 314. Further note that such removal will improve PMD and insertion loss. The quarter wave plate 318 would be located elsewhere, for example connected to mirror 1100. The curved mirror reduces insertion loss of the reflected signal, as the curvature of the mirror is selected to approximately match the Gaussian propagating wavefront emerging from collimator 310. Thus, approximately all of the beam energy of the reflected signal can be coupled back into the collimator 310. The waist position 1101 ($Z_{W0}$) and size ($W_0$) is based on the parameters of the collimator lens 310, which is a graded refractive index (GRIN) lens. The size and position can be obtained from lens manufacturer information or these characteristics can be measured. The phase radius and beam size of the Gaussian propagating beams can be calculated at any position along the propagating path or working distance 1102 based on the waist position. The phase radius is represented by the formula:

$$R(z)=z(1+(z_0/z)^2);$$

where z is the distance from the waist position along the optical axis, $z_0$ is the Rayleigh range, which is calculated by $z_0=\pi W_0^2/\lambda$, wherein $W_0$ is the half diameter of the smallest beam size. This allows the radius of curvature and size of the mirror 1100 to be selected to reflect the beam back to the collimator without loss. The mirror may have a gold or dielectric coating surface. A mechanical structure would then be used to hold the mirror in the system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A filter for reducing noise from a wavelength division multiplexing (WDM) signal to form a filter output signal, the filter comprising:
   a first stage that uses polarization based filtering to remove a portion of the noise to form a first reduced noise, and forms a first output signal from the WDM signal and the first reduced noise;
   a second stage that uses polarization based filtering to remove a portion of noise from the first reduced noise to form a second reduced noise, and forms a second output signal from the WDM signal and the second reduced noise; and
   a reflection stage that reflects the second output signal back into the second stage for further processing by the second stage;
   wherein the further processing by the second stage removes a portion of noise from the second reduced noise to form a third reduced noise, and forms a third output signal from the WDM signal and the third reduced noise; and
   the third output signal is provided to the first stage for further processing by the first stage that removes a portion of noise from the third reduced noise to form a fourth reduced noise, and forming the filter output signal from the WDM signal and fourth reduced noise.

2. The filter of claim 1 wherein:
   the WDM signal is in a first spectral band and the noise is in a second spectral band.

3. The filter of claim 1 wherein the first stage comprises:
   a first birefringent element that spatially separates the noise and the WDM signal into a first beam and a second beam that have orthogonal polarizations, wherein each of the first beam and the second beam includes a portion of the WDM signal and a portion of the noise;
   a wavelength filter having a polarization dependent optical transmission function that rotates one of the portion of the WDM signal and the portion of the noise in the first beam and rotates one of the portion of the WDM signal and the portion of the noise in the second beam;
   a second birefringent element that combines the portion of the WDM signal in the first beam and the portion of the WDM signal of the second beam to form the first output signal.

4. The filter of claim 3 wherein the wavelength filter comprises:
   a plurality of birefringent components with each element oriented in a predetermined direction.

5. The filter of claim 4 wherein each of the birefringent components comprise a birefringent material selected from the group consisting of:
   calcite, rutile, $YVO_4$, and $LiNbO_3$.

6. The filter of claim 3 wherein each of the first and second birefringent elements comprise a birefringent material selected from the group consisting of:
   calcite, rutile, $YVO_4$, and $LiNbO_3$.

7. The filter of claim 1 wherein the second stage comprises:
   a first birefringent element that spatially separates the first reduced noise and the WDM signal into a first beam and a second beam that have orthogonal polarizations, wherein each of the first beam and the second beam includes a portion of the WDM signal and a portion of the first reduced noise;
   a wavelength filter having a polarization dependent optical transmission function that rotates one of the portion of the WDM signal and the portion of the first reduced noise in the first beam and rotates one of the portion of the WDM signal and the portion of the first reduced noise in the second beam;
   a second birefringent element that combines the portion of the WDM signal in the first beam and the portion of the WDM signal of the second beam to form the second output signal.

8. The filter of claim 7 wherein the wavelength filter comprises:
   a plurality of birefringent components with each element oriented in a predetermined direction.

9. The filter of claim 8 wherein each of the birefringent components comprise a birefringent material selected from the group consisting of:
   calcite, rutile, $YVO_4$, and $LiNbO_3$.

10. The filter of claim 7 wherein each of the first and second birefringent elements comprise a birefringent material selected from the group consisting of:
    calcite, rutile, $YVO_4$, and $LiNbO_3$.

11. The filter of claim 1 wherein the reflection stage comprises:
    a quarter wave plate that receives the second output signal and sets the second output signal into a rotation; and
    a mirror that receives the rotating second output signal from the quarter wave plate and reflects the rotating second output signal back to the quarter wave plate;

wherein the quarter wave plate receives the reflected rotating second output signal, removes the rotation, and provides the reflected second output signal to the second stage for further processing by the second stage.

12. The filter of claim 11 wherein:
the mirror is a planar mirror.

13. The filter of claim 11 wherein:
the mirror is a curved mirror.

14. The filter of claim 13 wherein:
the curve mirror has a curvature that approximately matches the wavefront curvature of the second output signal.

15. A method for reducing noise from a wavelength division multiplexing (WDM) signal to form a filtered output signal, the method comprising the steps of:

(a) removing, via a first polarization based filter, a portion of the noise from the WDM signal to form a first reduced noise;

(b) removing, via a second polarization based filter, a portion of noise from the first reduced noise from the WDM signal to form a second reduced noise;

(c) reflecting the second output signal back into the second polarization based filter;

(d) removing, via the second polarization based filter a portion of noise from the second reduced noise to form a third reduced noise;

(e) removing, via the first polarization based filter a portion of noise from the third reduced noise to form a fourth reduced noise, and forming the filtered output signal from the WDM signal and fourth reduced noise.

16. The method of claim 15 wherein:
the WDM signal is in a first spectral band and the noise is in a second spectral band.

17. The method of claim 15 wherein the step (a) comprises the steps of:

spatially separating, via a first birefringent element, the noise and the WDM signal into a first beam and a second beam that have orthogonal polarizations, wherein each of the first beam and the second beam includes a portion of the WDM signal and a portion of the noise;

rotating, via a wavelength filter having a polarization dependent optical transmission function, one of the portion of the WDM signal and the portion of the noise in the first beam and one of the portion of the WDM signal and the portion of the noise in the second beam;

combining, via a second birefringent element that combines the portion of the WDM signal in the first beam and the portion of the WDM signal of the second beam.

18. The method of claim 17 wherein the wavelength filter comprises:
a plurality of birefringent components with each element oriented in a predetermined direction.

19. The method of claim 18 wherein each of the birefringent components comprise a birefringent material selected from the group consisting of:
calcite, rutile, $YVO_4$, and $LiNbO_3$.

20. The method of claim 17 wherein each of the first and second birefringent elements comprise a birefringent material selected from the group consisting of:
calcite, rutile, $YVO_4$, and $LiNbO_3$.

21. The method of claim 15 wherein the step (b) comprises the steps of:

spatially separating, via a first birefringent element, the first reduced noise and the WDM signal into a first beam and a second beam that have orthogonal polarizations, wherein each of the first beam and the second beam includes a portion of the WDM signal and a portion of the first reduced noise;

rotating, via a wavelength filter having a polarization dependent optical transmission function, one of the portion of the WDM signal and the portion of the first reduced noise in the first beam and one of the portion of the WDM signal and the portion of the first reduced noise in the second beam;

combining, via a second birefringent element, the portion of the WDM signal in the first beam and the portion of the WDM signal of the second beam.

22. The method of claim 21 wherein the wavelength filter comprises:
a plurality of birefringent components with each element oriented in a predetermined direction.

23. The method of claim 22 wherein each of the birefringent components comprise a birefringent material selected from the group consisting of:
calcite, rutile, $YVO_4$, and $LiNbO_3$.

24. The method of claim 21 wherein each of the first and second birefringent elements comprise a birefringent material selected from the group consisting of:
calcite, rutile, $YVO_4$, and $LiNbO_3$.

25. The method of claim 15 wherein the step (c) comprises the steps of:

receiving an output from the second polarization based filter;

circularly rotating the output from the second polarization based filter;

reflecting the circularly rotating output;

removing the rotation from the reflected circularly rotating output;

providing the reflected non-rotating second output signal to the second polarization based filter for further processing by the second polarization based filter.

26. The method of claim 25 wherein:
the step of reflecting is performed by a planar mirror.

27. The method of claim 25 wherein:
the step of reflecting is performed by a curved mirror.

28. The method of claim 27 further comprising the step of:
selecting a curvature of the curved mirror that approximately matches the wavefront curvature of the output from the second polarization based filter.

29. A filter for reducing noise from a wavelength division multiplexed (WDM) signal to form a filter output signal, wherein the WDM signal comprises a first group of channels, with a spacing between each of the channels, and the noise occurs on a second group of channels, the centers of which coincide with the centers of the spacings between the channels of the first group, the filter comprising:

a first stage that receives the WDM signal and the noise, separates the WDM signal and the noise into polarization components, rotates the polarizations components of one of the WDM signal and the noise, removes a portion of the noise to form a first reduced noise, and recombines the polarization components of the WDM signal and first reduced noise into a first output signal;

a second stage, that is coupled to the first stage, separates the first output signal into polarization components, rotates the polarizations components of one of the WDM signal and the first reduced noise, removes a portion of noise from the first reduced noise to form a second reduced noise, and recombines the polarization components of the WDM signal and second reduced noise into a second output signal; and a reflection stage, that is coupled to the second stage, for reflected the second output signal back into the second stage for further processing by the second stage;

wherein the further processing by the second stage removes a portion of noise from the second reduced noise to form a third reduced noise, and forms a third output signal from the WDM signal and the third reduced noise; and the third output signal is provided to the first stage for further processing by the first stage that removes a portion of noise from the third reduced noise to form a fourth reduced noise, and forming the filter output signal from the WDM signal and fourth reduced noise.

* * * * *